(12) United States Patent
Singh et al.

(10) Patent No.: US 12,100,394 B2
(45) Date of Patent: Sep. 24, 2024

(54) SYSTEM AND A METHOD FOR DETECTING POINT ANOMALY

(71) Applicant: L&T TECHNOLOGY SERVICES LIMITED, Chennai (IN)

(72) Inventors: Madhusudan Singh, Bangalore (IN); Aritra Ghosh Dastidar, Kolkata (IN); VV Nirmal Ramesh Rayulu, Hyderabad (IN); Kaushik Halder, Kolkata (IN); Ajay Sha, Alipurduar (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 17/535,698

(22) Filed: Nov. 26, 2021

(65) Prior Publication Data

US 2024/0071375 A1    Feb. 29, 2024

(51) Int. Cl.
*G06F 40/10* (2020.01)
*G06F 40/20* (2020.01)
*G06F 40/205* (2020.01)
*G06F 40/279* (2020.01)
*G10L 15/16* (2006.01)
*G10L 15/18* (2013.01)

(52) U.S. Cl.
CPC .......... *G10L 15/1815* (2013.01); *G06F 40/10* (2020.01); *G06F 40/20* (2020.01); *G06F 40/205* (2020.01); *G10L 15/16* (2013.01)

(58) Field of Classification Search
CPC ..... G10L 15/16; G10L 15/1815; G06F 40/00; G06F 40/20; G06F 40/279
See application file for complete search history.

(56) References Cited

U.S. PATENT DOCUMENTS

2016/0321358 A1* 11/2016 Kanani ................ G06F 40/284
2018/0173698 A1*  6/2018 Dubey ................ G06F 16/3347

* cited by examiner

*Primary Examiner* — Daniel C Washburn
*Assistant Examiner* — Penny L Caudle
(74) *Attorney, Agent, or Firm* — Kendal M. Sheets

(57) ABSTRACT

A method for detecting point anomaly in a text data is disclosed. The method may include tokenizing text input comprising a plurality of text entities into a plurality of tokens, annotating, by the point anomaly detection device, the plurality of tokens, based on one or more annotation parameters. One or more annotation parameters comprise a part-of-speech, a sentiment polarity, a negation statement, and domain rules. The method further includes identifying from one or more annotated tokens, at least one of: one or more anomaly subject tokens, one or more anomaly type tokens, and one or more action type tokens from plurality of tokens. The method further includes generating inferences based on the identified one or more anomaly type tokens, the one or more action type tokens from the plurality of tokens, and the one or more annotation parameters.

14 Claims, 10 Drawing Sheets

300C

| INPUT LOG ||
|---|---|
| PROBLEM DESCRIPTION BY USER | PROBLEM DESCRIPTION BY ENGINEER |
| Was the device in Clinical use at the time the issue was discovered? Yes | Was the device in Clinical use at the time the issue was discovered? Yes |
| Was any patient or user harmed? * No | Was any patient or user harmed? * No |
| If the device has alarm/alert capability, did it alarm/alert as it should have at the time the issue | If the device has alarm/alert capability, did it alarm/alert as it should have at the time the issue |
| Was this an out of box failure? N/A | Was this an out of box failure? N/A |
| Potential Safety Form.N/A | Potential Safety Form N/A |
| Problem as reported by Customer. A 01-A-400 error was reported | Problem as reported by Customer. System produce an error of 012.UWW2.6A12.98 and also static CW doppler noise. |
| FSE/RTAC Description of Problem (or Confirmation of problem as reported by Customer in Q6). Confirm. | Description of Problem (or Confirmation of problem as reported by Customer in Q6). Confirm. |
| What troubleshooting was performed? What were the results? error log reported a 00-A-200 AV on probe, front end test passed. | What troubleshooting was performed? What were the results? N/A |
| What actions were taken to repair the equipment? Replaced Y6-21 probe and performed function test. | What actions were taken to repair the equipment? Problem is intermittent, replaced Acq. Module and perform system function test. |
| Attach or document any test and inspection data used to perform the repair to specified requirements. See tool. | Attach or document any test and inspection data used to perform the repair to specified requirements. See PA tool. |
| List all calibrated Tools and Test equipment (if applicable) used during servicing. Include make, model, and serial numbers. | List all calibrated Tools and Test equipment (if applicable) used during servicing. Include make, model, and serial numbers. |

FIG. 3C

Output Log

| Transpose Issue Description (ROI) | Final Issue Part | Final Issue | Final Issue Drilldown | Action Taken | Error Value | Last Error Value | Second Last Error Value |
|---|---|---|---|---|---|---|---|
| System produce an error of 012.UWW2.6A12.98 and also static CW doppler noise. Replaced Y6-21 probe and performed function test. A 01-A-400 error was reported. Problem is intermittent, replaced Acq. Module and perform system function test. | Doppler | Software Crash | 01-A-400 | replaced Y6-21 probe and performed function test.; problem is intermittent, replaced acq. module and perform system function test. | error012.UWW2.6A12.98;00-A-200 AVerror; error01-A-400 | 01-A-400 | 00-A-200 AV |

FIG. 3D

| INPUT LOG |
|---|
| PROBLEM DESCRIPTION BY ENGINEER |
| Control Panel Arm not holding not  holding the control panel up unless the |
| Resolution |
| Replaced both arms in the control   panel articulation arm. |
| System returned to use fully   functional. |

| OUTPUT LOG | | | | | | |
|---|---|---|---|---|---|---|
| Transpose Issue | Final | Final | Final | Action Taken | Error Value | Last Error | Second |
| Control Panel Arm not holding not holding the control panel up unless the solenoid is engaged to lock in  position. replaced both arms in the control panel articulation arm. | Control Panel | Mechanical | Control Panel Arm | Replaced both arms in the control panel articulation arm. | error012.UWW2. 6A12.98;00-A-200 AVerror; error01-A-400 | 01-A-400 | 00-A-200 AV |

INPUT LOG

PROBLEM DESCRIPTION BY ENGINEER

Intermittent A0-11-34-23error

HW test: pass log analysis:checked A0-11-34-23 error during PW volume change

System returned to use fully functional.

Resolution

Upgraded SW from 1.0.2 to 2.0.1

HW test: pass

Operational test:pass network test: pass device to be monitored, but now in full spec.

FIG. 3G

Output Log

| Transpose Issue Description (ROI) | Final Issue Part | Final Issue | Final Issue Drilldown | Action Taken | Error Value | Last Error Value | Second Last Error |
|---|---|---|---|---|---|---|---|
| Intermittent A0-11-34-23 error. checked A0-11-34-23 error during PW volume change. Upgraded SW from 1.0.2 to 2.0.1 | Software | Software Crash | A0-11-34-23 | Upgraded SW from 1.0.2 to 2.0.1 | A0-11-34-23 error | A0-11-34-23 | |

FIG. 3H

SYSTEM AND A METHOD FOR DETECTING POINT ANOMALY

TECHNICAL FIELD

This disclosure relates generally to a point anomaly detection, and more particularly to a system and a method for detecting point anomalies in text data.

BACKGROUND

Typically, anomaly detection may be defined as identification of any data, event or conditions that diverges from an expected pattern. The anomaly detection aims to detect abnormal patterns deviating from the remaining data (such as, text data), are called anomalies or outliers. However, such anomaly detection can be a monotonous and challenging task for humans. Most of the time the anomalies go undetected and the industry are unable to handle them due to ineffective anomaly detection techniques. The current knowledge is not enough to define a class. Often, no examples are available in the data to describe the anomaly accurately.

In certain scenarios, managing and monitoring different components of various systems, such as computer systems or malfunctioning equipment may be close to impossible for a human given the current complexity of today's computer systems. The anomaly detection may play an instrumental role for handling anomalies associated with log of information that can come from, without limitation, an application, process, operating system, hardware component, and/or a network. Anomalous data may be easy to identify by using supervised, semi supervised anomaly detector models. However, in some scenarios, unsupervised anomaly detector models have to be used where the data may not be labeled as "normal" and "abnormal". There is no ground truth from which to expect the outcome to be.

Accordingly, there is a need for a system and method for detecting point anomaly in text data

SUMMARY OF THE INVENTION

In an embodiment, a method for detecting point anomaly in a text input is disclosed. The method may include tokenizing the text input comprising a plurality of text entities into a plurality of tokens, annotating, by the point anomaly detection device, the plurality of tokens, based on one or more annotation parameters, wherein the one or more annotation parameters comprise a part-of-speech (POS), a sentiment polarity, a negation statement, and domain rules. The method may further include identifying from the one or more annotated tokens, at least one of: one or more anomaly subject tokens, one or more anomaly type tokens, and one or more action type tokens from the plurality of tokens, based on the one or more annotation parameters. The method may further include generating inferences based on the identified one or more anomaly type tokens, the one or more action type tokens from the plurality of tokens, and the one or more annotation parameters.

In an embodiment, a system for detecting point anomaly in a text input is disclosed. The system comprises a processor and a memory communicatively coupled to the processor. The memory stores processor-executable instructions, which, on execution, causes the processor to tokenize the text input comprising a plurality of text entities into a plurality of tokens, annotate the plurality of tokens, based on one or more annotation parameters, wherein the one or more annotation parameters comprise a part-of-speech (POS), a sentiment polarity, a negation statement, and domain rules. The processor-executable instructions, on execution, further causes the processor to identify from the one or more annotated tokens, at least one of: one or more anomaly subject tokens, one or more anomaly type tokens, and one or more action type tokens from the plurality of tokens, based on the one or more annotation parameters. The processor-executable instructions, on execution, further causes the processor to generate inferences based on the identified one or more anomaly type tokens, the one or more action type tokens from the plurality of tokens, and the one or more annotation parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3C and FIG. 3D illustrate tabular representations collectively input log and output log respectively for detecting anomalies in log data, in accordance with an embodiment of the present disclosure.

FIG. 3E and FIG. 3F illustrate an input log and an output log, in accordance with an embodiment of the present disclosure.

FIG. 3G and FIG. 3H illustrate exemplary scenarios for detecting point anomalies in text data, in accordance with an embodiment of the present disclosure.

DETAILED DESCRIPTION OF THE DRAWINGS

Figure 1:
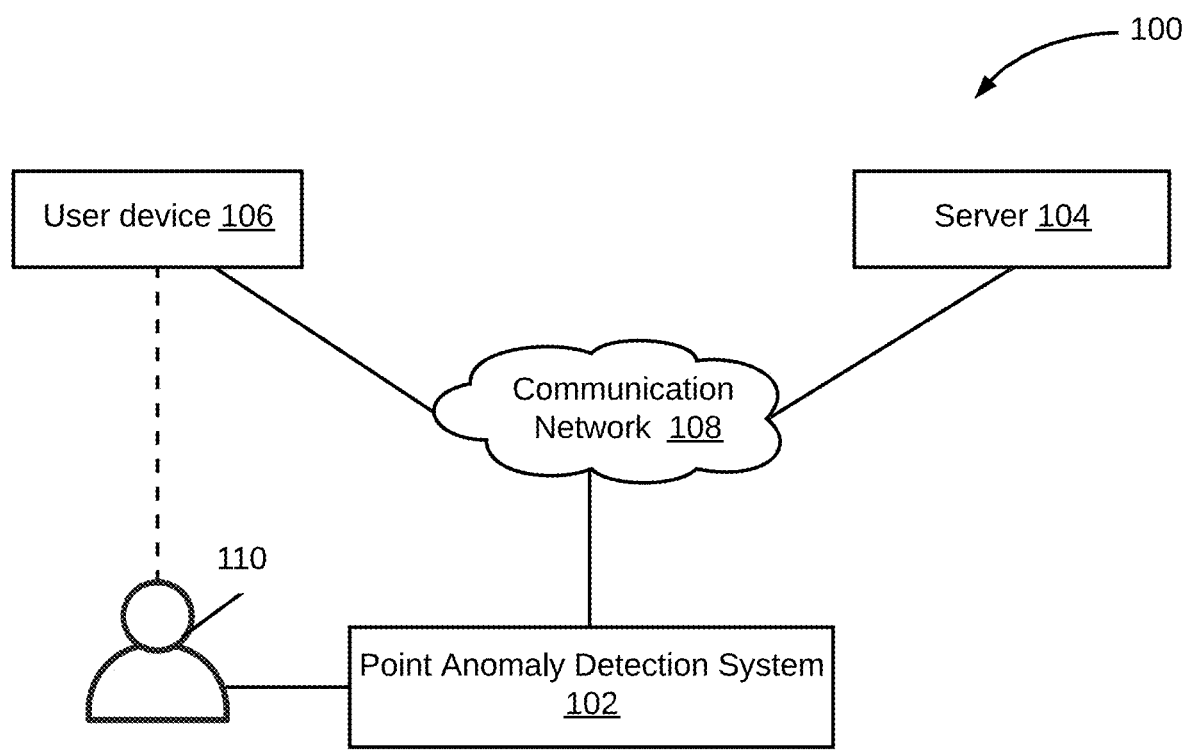
FIG. 1 is a block diagram that illustrates an environment of a point anomaly detection system for detecting point anomalies in text data, in accordance with an embodiment of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following described implementations may be found in the disclosed method and system for detecting point anomaly detection in text input (also referred as text data), such as, log data associated with computer systems. The point anomaly detection corresponds to detecting single anomaly instances in a large dataset. The disclosed system (referred as a point anomaly detection system) may use a deep learning model, such as, but not limited to, a Named Entity Recognition (NER) model and a Natural Language Processing (NLP) based machine learning model, rule-based machine learning model and/or a combination thereof.

One of the most common sources of quality problems is faulty equipment which has not been maintained. Hence, monitoring the condition of equipment, devices, machines and components, such as, but not limited to, levers, cooling fans, bearings, turbines, gears, belts and maintaining a desirable working state becomes very crucial. The disclosed point anomaly detection system may be used to detect any anomalies from monitored equipment or production facilities to continually ensure that the equipment are working correctly. The disclosed point anomaly detection system may identify the root cause of failure of the equipment that may help in maintenance and re-initiation of the equipment to normal working conditions. The point anomaly detection system may detect anomalies to point out quickly where an error is occurring and provide early alerts to responsible parties, such as, the manufacturing personnel or a technical support to act on the issue.

The disclosed point anomaly detection system plays an instrumental role in robust distributed software systems to enhance communication around equipment or system behavior, to improve root cause analysis and reduces threats to a software ecosystem.

Exemplary aspects of the disclosure may find patterns in text data that do not conform to expected behavior. The point anomaly detection system may aim to detect abnormal patterns deviating from the rest of the text data. Such abnormal patterns may be referred to as anomalies, outliers, discordant observations, exceptions, aberrations, surprises, peculiarities or contaminants in different application domains. The disclosed point anomaly detection system may also aim at detecting previously unobserved patterns in the text data. The unobserved patterns may be incorporated into the deep learning model after being detected. The disclosed AI based test automation system makes use of continuous learning through previous experience to achieve improvement in performance.

The disclosed point anomaly detection system may avoid unplanned downtime, increase productivity, optimize the use of maintenance resources, improve asset (equipment, machines) health and performance and increase customer satisfaction.

Referring to FIG. 1, a block diagram of an environment for a point anomaly detection system for detecting point anomaly in text data is illustrated, in accordance with an embodiment of the present disclosure. The environment 100 includes a point anomaly detection system 102, a server 104, a user device 106, and a communication network 108. The point anomaly detection system 102 may be communicatively coupled to the server 104 and the user device 106, via the communication network 108. A user 110 may be associated with the AI based test automation system 102 or the user device 106.

The point anomaly detection system 102 may include suitable logic, circuitry, interfaces, and/or code that may be configured to receive data (such as, text data) from the server 104 for detecting anomalies. The text data may include, but not limited to, trace data and log data. The anomalies may be detected in executing components of a system or equipment. The anomalies may be detected from the text data by the point anomaly detection system 102 to provide information about components, equipment such as whether the component is operating properly or is malfunctioning. In accordance with an embodiment, the point anomaly detection system 102 may also be implemented within a monitoring infrastructure. In accordance with an embodiment, the point anomaly detection system 102 may be configured to detect anomalies in text data in absence of historical data.

In accordance with an embodiment, the point anomaly detection system 102 may correspond to a host-based anomaly detection system that uses system call data of running computers. By way of an example, an application associated with a hardware of a computing system generates a set of data sequences in execution phase. Such a set of data sequences may be indicative of health of corresponding instance of the application executing on the hardware. The set of data sequences may include, but not limited to, counters associated with CPU (central processing unit) load, memory, network 1/O (input/output), exceptions rate, and objects in memory stores. In contrast to conventional anomaly detection systems where the log information may be examined in an offline mode, the point anomaly detection system 102 may detect anomalies in text data in near real time to enable problems to be found more quickly and as a result, to enable the problems to be fixed as soon as they occur.

Conventionally, anomalies may be detected by a human being who studies log data associated with an application, process, operating system, hardware component, and/or a network. Given the current complexity of computer systems, manual detection of anomalies in data, such as text data from log information may be a challenging task that consumes a lot of time and error prone. In contrast to conventional systems and methods, the point anomaly detection system 102 may generate inferences based on the identified anomalies.

The point anomaly detection system 102 may also include one or more machine learning models (not shown in the FIG. 1). The one or more machine learning models may correspond to unsupervised machine learning models for point anomaly detection. For unsupervised anomaly detection, the training data and test data may not be labelled. Furthermore, there may be no distinction between a training dataset and a test dataset. The point anomaly detection-based algorithms may be based on intrinsic properties of text data.

In accordance with an embodiment, the point anomaly detection system 102 may be configured to receive the text data for detecting anomalies from a cloud computing platform and infrastructure, or from one or more computers or computing devices directly or via the communication network 108.

The point anomaly detection system 102 or portions thereof may be provided as a stand-alone system or as a plug-in or add-in. By way of example, the point anomaly detection system 102 may be implemented as a plurality of distributed cloud-based resources by use of several technologies that are well known to those skilled in the art. Other examples of implementation of the point anomaly detection system 102 may include, but are not limited to, a web/cloud server, an application server, a media server, and a Consumer Electronic (CE) device.

The server 104 may include suitable logic, circuitry, interfaces, and/or code that may be configured to receive text data from components of systems or equipment that are continually monitored and processed for data points (text data) to detect anomalies. In accordance with an embodiment, the server 104 may be configured to receive data from a monitoring device that can monitor execution or operation of a component.

The anomalies may be detected in executing components of a system or equipment. as the component executes or operates by continually monitoring and processing the data points. In accordance with an embodiment, the server 104 may be configured to receive or collect the text data from the monitoring device continuously or intermittently or on demand. In accordance with an embodiment, the server 104 may be configured to store anomalies detected by the point anomaly detection system 102. In accordance with an embodiment, the server 104 may be configured to store, maintain, and execute one or more software platforms and programs, such as AI programs and machine learning programs and one or more databases. The server 104 may include a database having a plurality of tables, partitions and sub-partitions associated with text data. The text data may correspond to log information or system call data of running computers. In accordance with an embodiment, the server 104 may also store anomalies, unique identity numbers (IDs) associated with one or more of equipment for malfunction monitoring, a user (such as the user 110), events associated with the unique IDs.

Although in FIG. 1, the point anomaly detection system 102 and the server 104 are shown as two separate entities, this disclosure is not so limited. Accordingly, in some embodiments, the entire functionality of the server 104 may be included in the point anomaly detection system 102, without a deviation from scope of the disclosure.

The user device 106 may include suitable logic, circuitry, interfaces, and/or code that may be configured to provide input data (such as, text data) from the user 110 to the point anomaly detection system 102. In accordance with an embodiment, the user device 106 may provide feedback data from the user 110 to the point anomaly detection system 102. In accordance with an embodiment, when any name of material parts or equipment part is missed out for text data, then based on user intervention, correct output may be recorded in the server 104 from the user device 106, via the communication network 108. The anomaly can be displayed along with any related information to the user 110 associated with the user device 106 from the point anomaly detection system 102 or the server 104, via the communication network 108.

The functionalities of the user device 106 may be implemented in portable devices, such as a high-speed computing device, and/or non-portable devices, such as a server. Examples of the user device 106 may include, but are not limited to, a computing device, or a laptop. The user device 106 and the point anomaly detection system 102 are generally disparately located.

The communication network 108 may include a communication medium through which the point anomaly detection system 102, the server 104, and the user device 106 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 2:
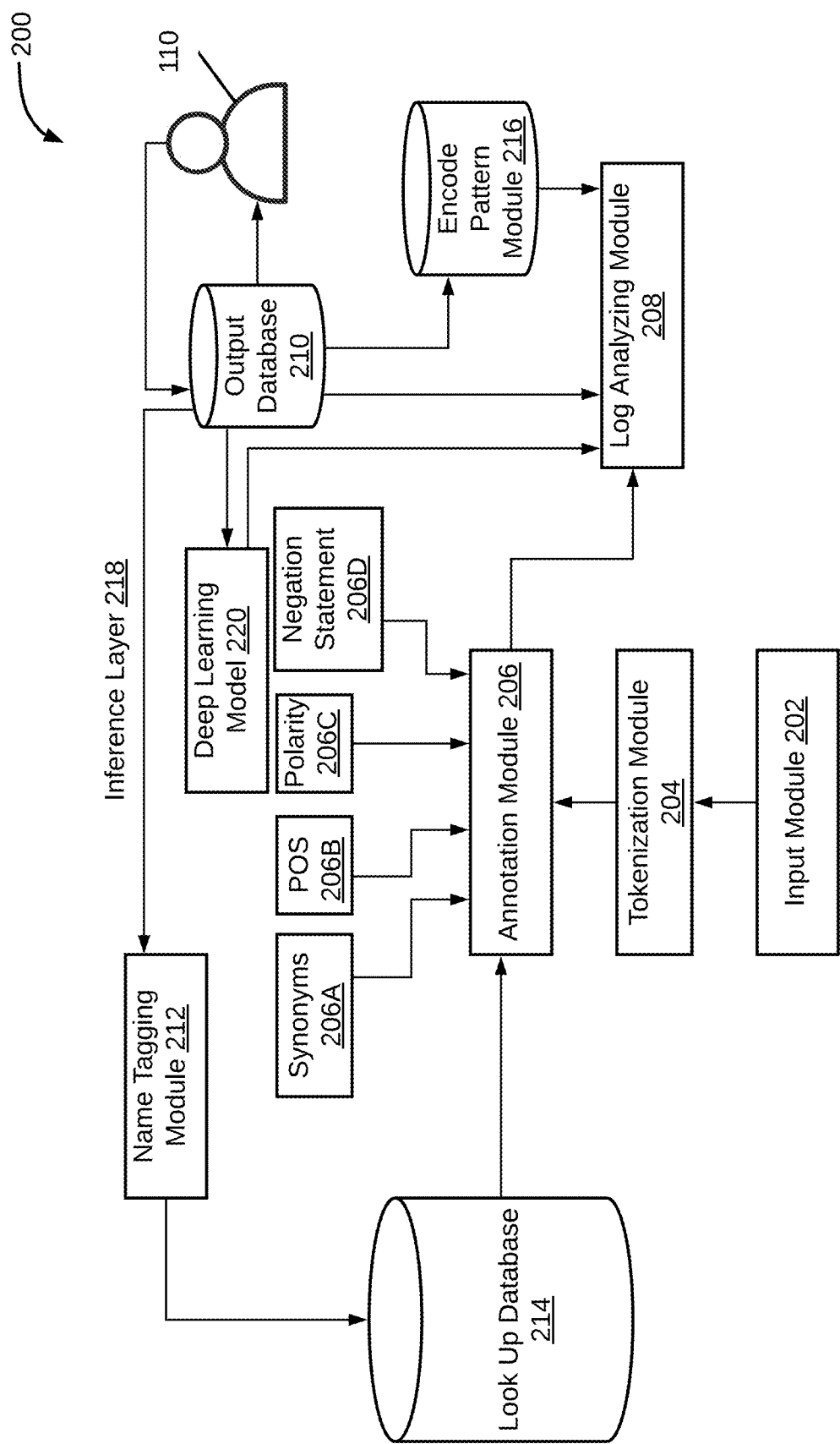
FIG. 2 is a functional block diagram of a point anomaly detection system for detecting point anomalies in text data, in accordance with an embodiment of the present disclosure.

FIG. 2 is a functional block diagram of a point anomaly detection system for detecting point anomalies in text data, in accordance with an embodiment of the present disclosure. FIG. 1 is explained in conjunction with elements from FIG. 2.

With reference to FIG. 2, the point anomaly detection system 102 may include an input module 202, a tokenizing module 204, an annotation module 206, a log analyzing module 208, an output database 210, a name tagging module 212, and a look-up database 214.

The input module 202 may receive text data as input data from the server 104. By way of an example, the input module 202 may also receive the text data from a data logger. For example, the data logger may be associated with the equipment that is monitored for errors/failures from logs. Further, the received text data may include meta data, such as, a field remark and a remote remark corresponding to a failure or an error which the equipment may have developed in the past. By way of another example, the input module 202 may receive the text data from the user device 106.

The tokenizing module 204 may be configured to tokenize the text data to generate a plurality of text entities. Such plurality of text entities may be referred as tokens. Tokenization is a way of separating a piece of text from text data into smaller units called tokens. It may be noted that, from the plurality of text entities, at least one of the plurality of text entities of the text data may be annotated by the annotation module 206, based on one or more annotation parameters. Therefore, upon tokenizing the text data, that is, upon generating the plurality of text entities, the tokenizing module 204 may send the plurality of text entities of the text data to the annotation module 206.

The annotation module 206 may receive the plurality of text entities of the text data as tokens from the tokenizing module 204. The annotation module 206 may further annotate at least one of the tokens of the text data, based on one or more annotation parameters. The one or more annotation parameters may include, but not limited to, a part-of-speech (POS), a sentiment polarity, a negation statement, and domain rules.

The POS parameter may facilitate building Named Entity Recognition (NER), (such as, most named entities are nouns) and extracting relations between words. Typically, for sentiment polarity, the sentiment may be quantified with a positive or negative value, called polarity. The overall sentiment may be inferred as positive, neutral or negative from the sign of a polarity score associated with the sentiment polarity. Further negation statement may include words, such as, but not limited to, no, not, and shouldn't. When a negation appears in a sentence it is important to determine the sequence of words that are affected by the term. The scope of negation may be limited only to the next word after a negation or may be extended up to other words following negation in the negation sentence. For classification tasks, domain-specific lists of words or phrases may be curated to train a machine learning model.

The annotation module 206 may refer to a look-up database 214 to annotate the tokens (or the plurality of text entities). For example, the look-up database 214 may store historical data of annotated plurality of text entities using which the annotation module 206 may annotate the plurality of entities of the text data, based on the annotation parameters.

In some embodiments, the plurality of text entities of the text data may be pre-processed to identify one or more text entities of the plurality of text entities which may be annotated. To this end, unique domain rules may be defined for the plurality of text entities to determine which text entity from the plurality of text entities needs to be accepted for annotation. By way of an example, a search key or search tag "name" is required in extracting values associated with the text data. For a name "XYZ", an annotation tag "name" may help in extracting the value "XYZ". Similarly, domain rules may be defined for the plurality of text entities to determine which text entity from the plurality of text entities needs to be ignored. For example, an observation having an attribute status value "In Process" can be ignored. Similarly, the domain rules may be defined for the plurality of text entities to determine what process needs to be followed by the plurality of text entities. Therefore, different rules may be defined for entities in a particular language (such as, English Language). Further, a threshold may be defined which may be updated in a rule book for processing. Therefore, upon selecting the entities to be annotated, some of the entities may be annotated by the annotation module 206, while some other entities may remain un-annotated.

The un-annotated entities may be sent to the inference layer 218 for annotation. The inference layer 218 may apply probabilistic approach to detect the error codes from the un-annotated text entities of the text data. The inference layer 218 may include a log analyzing module 208. The log analyzing module 208 may be configured to process one or more un-annotated text entities of the text data using at least one or more secondary data processing techniques, to annotate the one or more un-annotated text entities of the text data. The one or more secondary data processing techniques may include an encoding/decoding technique and a deep learning technique for annotating the one or more un-annotated text entities of the text data.

As mentioned earlier, the un-annotated text entities of the text data may include error codes. An encode pattern module 216 may perform the encoding/decoding technique to extract the error codes from the un-annotated text entities. In order to extract the error codes from the un-annotated text entities, the encode pattern module 216 may perform the following steps. For example, the steps may include determining a pattern associated with the token from the text data. The pattern may be determined based on identifying a text type associated with each of the plurality of text characters of the token. The steps may further include assigning each of the plurality of text characters, a character-type symbol corresponding to the text type associated with each of the plurality of text characters, thereby creating one or more clusters using similar character-type symbols positioned adjacent to each other, and assigning a cluster-type symbol to each of the one or more clusters to obtain the pattern associated with the input-token. The step may further include extracting text-entities matching the token, based on the pattern associated with the token.

The encoding/decoding technique may be useful for alphanumeric codes, for example, if error codes are alphanumeric and no "Search Keys" are present. In such cases, the alphanumeric codes may be encoded to form a pattern, and the pattern may be used to decode the error codes.

When the error codes are based on text sentences, for example, if error codes neither have "Search Keys" nor are in the form of alphanumeric codes, then in such cases, the whole sentence which carries error codes may be copied in the output database 210 along with a label for training a deep learning model 220. Further, scoring data may be sent to the deep learning model 220 to predict the error codes from the un-annotated text entities of the text data.

The output database 210 may store the error codes extracted using the one or more secondary data processing techniques. If the error code is missed out during processing of one or more un-annotated text entities of the text data, then an end user intervention may be needed to input the required specification in the output database 210, so that in the next execution phase, if such patterns are encountered then the inference layer 218 may not miss the values. Further, the name tagging module 212 may update the look-up database 214 with the annotated entities. For example, if any name of material parts or equipment parts which is present in the text sentences is missed out, then based on an end user intervention (such as, from the user 110), the correct output may be recorded in the output database 210. Upon correction of the output database 210, the name tagging module 212 may select unique equipment part/or material part name and update the look-up database 214. Further, the look-up database 214 may store equipment parts/or material parts details, such as object name and issue details of a particular object.

In accordance with an embodiment, data storage of the point anomaly detection system 102, such as, the output database 210, the look up database 214 may include suitable logic, circuitry, and/or interfaces that may be configured to store program instructions executable by a processor (not shown in FIG. 2) of the point anomaly detection system 102, operating systems, and/or application-specific information, such as logs and application-specific databases. The data storage may include a computer-readable storage media for carrying or having computer-executable instructions or data structures stored thereon. Such computer-readable storage media may include any available media that may be accessed by a general-purpose or special-purpose computer, such as the processor.

By way of example, and not limitation, such computer-readable storage media may include tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor to perform a certain operation or a set of operations associated with the point anomaly detection system 102. The functions or operations executed by the point anomaly detection system 102, as described in FIG. 1, may be performed by the processor. In accordance with an embodiment, additionally, or alternatively, the operations of the processor are performed by various modules that are described in detail, for example, in FIG. 2.

During operation, the input module 202 may receive the text data as input data. In accordance with an embodiment, the received text data may include meta data, such as, a field remark and a remote remark corresponding to a failure or an error which the equipment may have developed in the past. Further, the text data that may include text and words may be further processed for text normalization. In accordance with an embodiment, the text normalization of the text data may be done by using stemming and lemmatization techniques. Stemming may produce morphological variants of a root/base word. When searching text for a certain keyword, the search may return variations of the word. For instance, searching for "load" might also return "loads" and "loading". Here, "load" would be the stem for [load, loader, loading, loads]. Stemming is a method for cataloging related words that chops off letters from the end until the stem is reached.

Further, lemmatization works beyond word reduction and considers a full vocabulary of a language to apply a morphological analysis to words. By way of an example, lemma of 'was' is 'be' and the lemma of 'mice' is 'mouse'. The lemmatization may be more informative than simple stemming as the lemmatization looks at surrounding text to determine part of speech for a given word. In accordance with an embodiment, the input module 202 may be configured to perform stemming and lemmatization on the text data. The tokenizing module 204 may be configured to tokenize the text data to generate a plurality of text entities. Such plurality of text entities may be referred as tokens. Additionally, the tokenizing module 204 may be further configured to perform stemming and lemmatization.

The annotation module 206 may further annotate at least one of the tokens of the text data, based on one or more annotation parameters. The one or more annotation parameters may include, but not limited to, a part-of-speech (POS), a sentiment polarity, a negation statement, and domain rules. The annotation module 206 may refer to a look-up database 214 to annotate the tokens (or the plurality of text entities). In accordance with an embodiment, the annotation module 206 may annotate the plurality of entities of the text data, based on the annotation parameters. The log analyzing module 208 may be configured to process one or more un-annotated text entities (from the annotation module 206) of the text data using at least one or more secondary data processing techniques, to annotate the one or more un-annotated text entities of the text data. An encode pattern module 216 may perform the encoding/decoding technique to extract the error codes from the un-annotated text entities. The output database 210 may store the error codes extracted using the one or more secondary data processing techniques. If the error code is missed out during processing of one or more un-annotated text entities of the text data, then an end user intervention may be needed to input the required specification in the output database 210, so that in the next execution phase, if such patterns are encountered then the inference layer 218 may not miss the values. Further, the name tagging module 212 may update the look-up database 214 with the annotated entities. For example, if any name of material parts or equipment parts which is present in the text sentences is missed out, then based on an end user intervention (such as, from the user 110), the correct output may be recorded in the output database 210. Upon correction of the output database 210, the name tagging module 212 may select unique equipment part/or material part name and update the look-up database 214. Further, the look-up database 214 may store equipment parts/or material parts details, such as object name and issue details of a particular object.

Figures 3A, 3B:
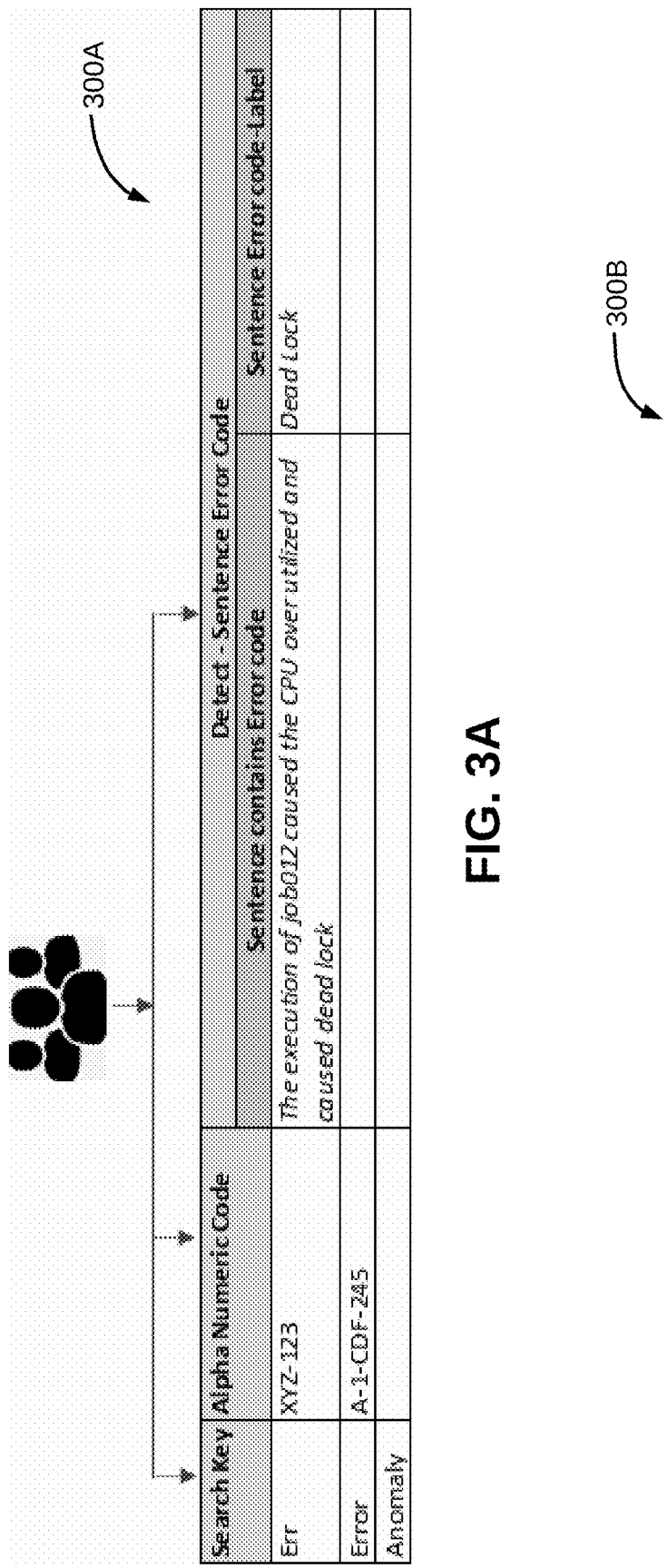
FIG. 3A illustrates a tabular representation of a domain repository, in accordance with an embodiment of the present disclosure.
FIG. 3B illustrates a tabular view of a final output of a model, in accordance with an embodiment of the present disclosure.

Referring now to FIG. 3A, a tabular representation of a domain repository 300A is illustrated, in accordance with an embodiment of the present disclosure. The domain repository may include search keys, or domain keys, like "Err", and "Error". Such search keys, or domain keys may be useful for an unsupervised machine learning model. It may be noted that one or more unique labels may be present for creating patterns during run-time, for example, error codes, like "XYZ-123". This process of labeling of observations may be helpful for a supervised machine learning model to train, for example, with respect to an attribute "Sentence contains Error Code" & "Sentence Error Code-Label". Referring to the tabular representation 300A of the domain repository, in the first entry, an alphanumeric code may be detected in a text sentence "the execution of job012 caused the CPU over utilized and caused dead lock". Further, a corresponding label (tag) assigned to this entry is "dead lock". In the second entry, an extracted error code is of alphanumeric code of the form "A-1-CCDF-245".

Referring now to FIG. 3B, a tabular view of a final output 202 of a model is illustrated, in accordance with an embodiment of the present disclosure. As shown in the FIG. 3B, final output may include extracted error codes from the text data. For an error code "XYZ-123", a corresponding issue in an instrument is identified as "the liver is broken". Based on an identified anomaly, a corresponding part to be replaced for the above error is "liver", and therefore, a resolution determined by the machine learning model of the point anomaly detection system 102 "liver replaced" may be added in final output.

Referring now to FIG. 3C-3D, a tabular representation 300C and 300D collectively illustrate input log and output log respectively for detecting anomalies in log data, in accordance with an embodiment of the present disclosure.

In accordance with an embodiment, the point anomaly detection system 102 may be configured to process the input log to generate output log. As shown in the tabular representation 300D, transpose issue description corresponds to "a system produce an *error* error of 012.UWW2.6A12.98 and also static CW doppler noise. Replaced Y6-21 probe and performed function test. A 01-A-400 *error* error was reported. Problem is intermittent, replaced Acq. Module and perform system function test." The marked and bold words resemble negative sentiment, such as, error and problem. Also "Replaced" word was added to a sentiment model (from the one or more machine learning model) as negative sentiment word. The "replaced" word was also tagged through a semantic tagger where replace/change got matched to "replaced".

Further for getting "Final Issue part" in 300D, the point anomaly detection system 102 may be configured to use Domain parts list database (such as, the look up database 214) to extract part name with syntactic and semantic match for the equipment or the instrument. When the part name may be absent, then nouns may be given a possible issue part from transpose issue description. The "Final Issue part" may correspond to "Doppler" in FIG. 3D.

Further for getting "Final Issue" and "Final Issue Drill-down", the point anomaly detection system 102 may be configured to use a classification model (from the one or more machine learning models) where text data was prepared based on domain rules. One of the rules specified for presence of error code may be that the final issue should be "Software crash" and issue drilldown (a sub category) should be last error code extracted (such as, 01-A-400).

Further for getting "Action Taken", the point anomaly detection system 102 may be configured to generate "replaced Y6-21 probe and performed function test; problem is intermittent, replaced acq. module and perform system function test.". "Replaced" word was also tagged through the semantic tagger where replace/change got matched to "replaced". Also, sentence may contain a noun and a verb when the semantic tagger fails which in this case is replaced (verb) and "Y6-21, Acq., Module, system" etc. In accordance with an embodiment, "Y6-21" was present in Domain parts Database (such as, the look up database 214).

Further for getting "Error values" as error 012.UWW2.6A12.98; 00-A-200 AV error and last error value as "01-A-400", the point anomaly detection system 102 may be configured to use error semantic tagger along with alphanumeric pattern encryption. For example, "dpadp-dadpd" was one of the encoded patterns that got matched to "012.UWW2.6A12.98; 00-A-20" where "a" stands for alphabet, "p" for punctuation and "d" for digit respectively. "Last error value" may simply correspond to a last matched value through pattern in the "error value" column.

Similar procedure may be followed in FIG. 3E-3F for an output log for a corresponding input log and FIG. 3G-3H for an output log for a corresponding input log.

Figure 4:
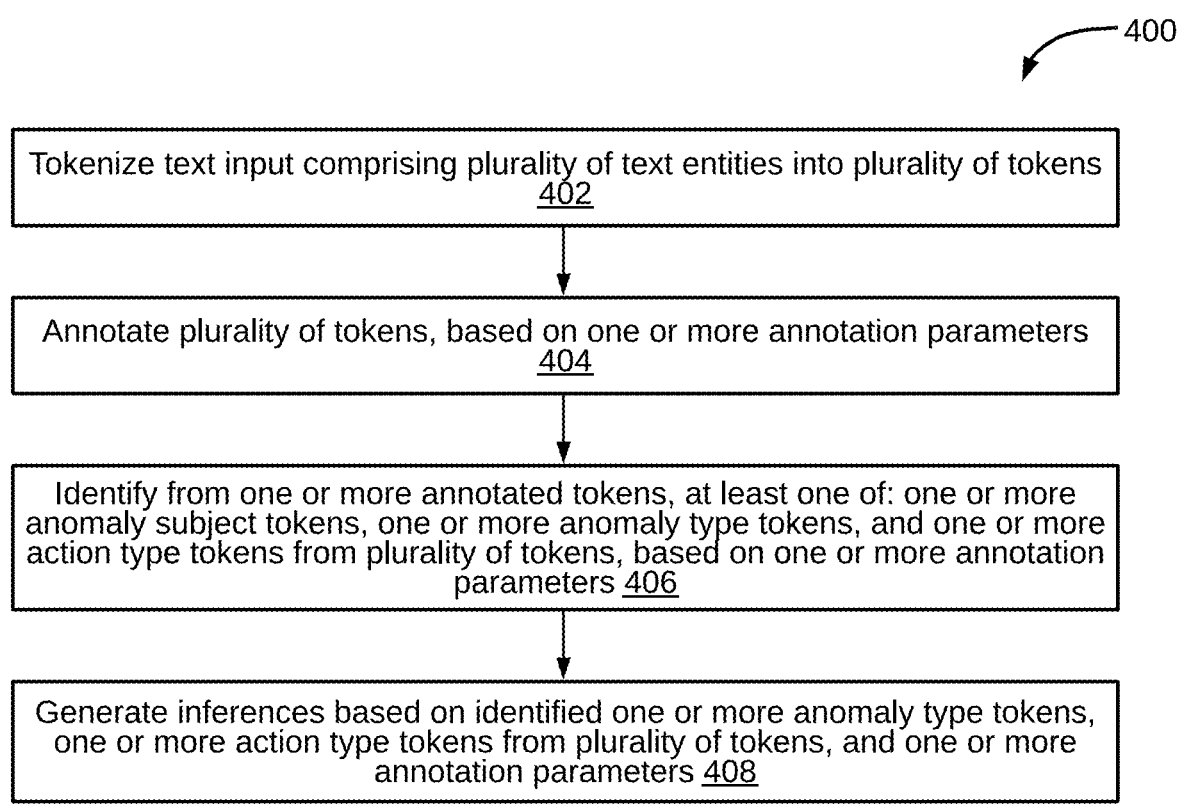
FIG. 4 is a flowchart that illustrates an exemplary method for detecting point anomaly in text data, in accordance with an embodiment of the present disclosure.

Referring now to FIG. 4, a flowchart of an exemplary method 400 for detecting point anomaly in a text data is illustrated, in accordance with an embodiment of the present disclosure. The control starts at step 402 and proceeds to step 404.

At step 402, the text input comprising a plurality of text entities may be tokenized into a plurality of tokens. In accordance with an embodiment, the tokenization module 204 may be configured to tokenize the text input comprising the plurality of text entities into the plurality of tokens. In accordance with an embodiment, the input module 202 may be configured to pre-process the plurality text entities of the text input to shortlist one or more text entities to be annotated.

At step 404, the plurality of tokens may be annotated, based on one or more annotation parameters. In accordance with an embodiment, the annotation module 206 may be configured to annotate the plurality of tokens, based on one or more annotation parameters. The one or more annotation parameters comprise a part-of-speech (POS), a sentiment polarity, a negation statement, and domain rules.

For example, for an input text in form of a sentence "XYZ crashed and not working", each word of sentence may be annotated based on its POS (for example, noun, verb, etc.), sentiment polarity (for example, negative sentiment, positive sentiment, or neutral statement), negation statement (for example, when "Verb", "Adjective" and "Adverb" of the sentence are associated with negative words like "Nor", "Not", "No", "Un), and domain rules. For example, in the above sentence, "XYZ" is a noun (POS), has a neutral sentiment polarity, and is an object name (domain rule). Further, the word "crashed" is a verb (POS), and has a negative sentiment polarity. Furthermore, and the phrase "not working" is a verb having a negation statement. Accordingly, annotation may be assigned to each of the words (entities). It may be understood that that when a positive polarity term is associated with negation term, then the polarity score of the term may be multiplied by (−1). If a negative polarity term is associated with negation term, then the polarity score of the term may be further multiplied by (−1). For example, in the term "Not Bad", the negation score is −1, and score of the word "bad" is −2, hence polarity of "Not Bad" is 2 (positive).

In accordance with an embodiment, the log analyzing module 208 may be configured to process one or more un-annotated text entities of the text input using at least one of one or more secondary data processing techniques, to annotate the one or more un-annotated text entities of the text input. In accordance with an embodiment, the one or more secondary data processing techniques comprise: an encoding/decoding technique for the text input comprising alphanumeric codes and a deep learning technique for the input text comprising text sentences.

It may be noted that feedbacks/suggestions of an end user (such as, the user 110) along with annotation may be received and stored in a database, and unique encoded patterns may be generated for each suggestion. The process of encoding may include assigning a letter 'a' for alphabets, letter 'p' for punctuations, and letter 'd' for digits in an alphanumeric code to generate an encoded value. For example, for an alphanumeric code "abc-123", the corresponding encoded value is "apd". A patterns run-time is then decoded and regular expressions matching the encoded value may be extracted. For non-alphanumeric codes, the deep learning model 220 may be employed for annotation.

In accordance with an embodiment, the point anomaly detection system 102 may update the look-up database 214 with the annotated entities. Once the process of annotating the one or more un-annotated text entities of the text data using the encoding/decoding technique and the deep learning technique is completed, the look-up database 214 may get updated with updated annotation entities.

At step 406, from the one or more annotated tokens, at least one of: one or more anomaly subject tokens, one or more anomaly type tokens, and one or more action type tokens from the plurality of tokens may be identified, based on the one or more annotation parameters. In accordance with an embodiment, the log analyzing module 208 may be configured to identify from the one or more annotated tokens, at least one of: one or more anomaly subject tokens, one or more anomaly type tokens, and one or more action type tokens from the plurality of tokens, based on the one or more annotation parameters. In accordance with an embodiment, an anomaly subject token may be identified based on at least one of: a mapping of each of the plurality of tokens with a predefined database, based on sematic matching and syntactic matching, a POS associated with each of the plurality of tokens. The POS associated with the identified anomaly subject token may be a noun.

In accordance with an embodiment, the one or more anomaly type tokens may be identified from the plurality of tokens, based on at least one of a mapping of each of the plurality of tokens with a lookup table and one or more domain rules. In accordance with an embodiment, the log analyzing module 208 may be configured to identify one or more action type tokens from the plurality of tokens, based on at least one of: a mapping of each of the plurality of tokens with a predefined domain database, based on sematic matching and syntactic matching or a POS associated with each of the plurality of tokens. The POSs associated with the identified one or more anomaly subject tokens includes a noun and a verb. The mapping comprises fetching one or more synonyms of each of the plurality of tokens.

At step 408, inferences may be generated based on the identified one or more anomaly type tokens, the one or more action type tokens from the plurality of tokens, and the one or more annotation parameters. In accordance with an embodiment, the name tagging module 212 may be configured to generate inferences based on the identified one or more anomaly type tokens, the one or more action type tokens from the plurality of tokens, and the one or more annotation parameters.

Figure 5:
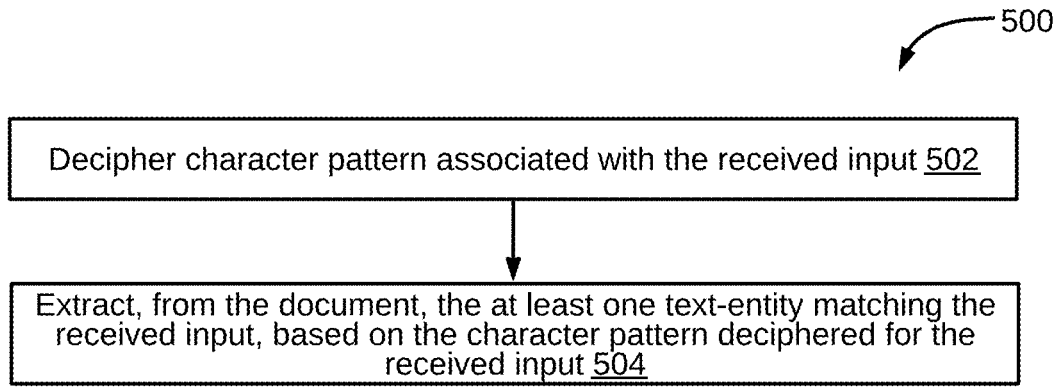
FIG. 5 is a flowchart of an exemplary method of extracting text from a document based on a received input, in accordance with an embodiment of the present disclosure.

FIG. 5 is a flowchart that illustrates an exemplary method 500 of extracting text from a document based on a received input, in accordance with an embodiment of the present disclosure. FIG. 5 is explained in conjunction with elements from FIG. 1 to FIG. 4. The operations of the exemplary method 500 may be executed by any computing system, for example, by the text extraction system 102 of FIG. 1. The operations of the method 500 may start at step 502 and proceed to step 504.

At step 502, a character pattern associated with the received input may be deciphered. In accordance with an embodiment, the text extraction system 102 may be configured to decipher a character pattern associated with the received input. In accordance with an embodiment, the received input (also referred as input-token) may include a plurality of characters. For example, the character type associated with each of the plurality of characters in the received input may include at least one of: an alphabet, a punctuation, or a digit. The step 502 of deciphering the character pattern associated with the received input is further explained in detail in conjunction with FIG. 6.

Figure 6:
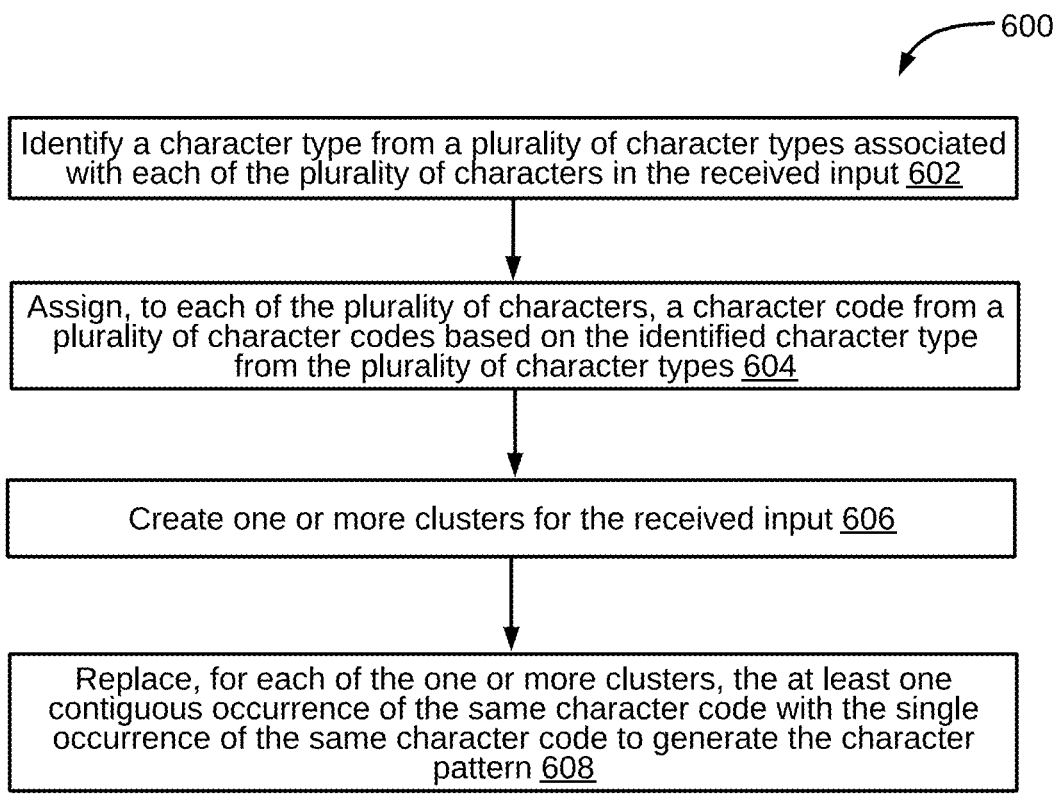
FIG. 6 is a flowchart of an exemplary method of deciphering a character pattern associated with the received input, in accordance with an embodiment of the present disclosure.

Referring now to FIG. 6, a flowchart of an exemplary method 600 of deciphering a character pattern associated with the received input is illustrated, in accordance with an embodiment of the present disclosure. FIG. 6 is explained in conjunction with elements from FIG. 1 to FIG. 5.

At step 602, a character type from a plurality of character types may be identified associated with each of the plurality of characters in the received input. In accordance with an embodiment, the text extraction system 102 may be configured to identify a character type from a plurality of character types associated with each of the plurality of characters in the received input.

At step 604, a character code from a plurality of character codes may be assigned to each of the plurality of characters. In accordance with an embodiment, the text extraction system 102 may be configured to assign, to each of the plurality of characters, a character code from a plurality of character codes based on the identified character type from the plurality of character types. For example, the character code corresponding to an alphabet may be 'a'. Similarly, the character code corresponding to a punctuation may be 'p', and to a digit may be 'd'.

At step 606, one or more clusters may be created for the received input. In accordance with an embodiment, the text extraction system 102 may be configured to create one or more clusters for the received input in response to assigning the character code to each of the plurality of characters. In accordance with an embodiment, each of the one or more clusters may include the at least one contiguous occurrence of the same character code.

At step 608, for each of the one or more clusters, the at least one contiguous occurrence of the same character code may be replaced with a single occurrence of the same character code to generate the character pattern. In accordance with an embodiment, the text extraction system 102 may be configured to replace, for each of the one or more clusters, the at least one contiguous occurrence of the same character code with the single occurrence of the same character code to generate the character pattern.

Returning to FIG. 5, at step 504, at least one text-entity from the document may be extracted that matches the received input. In accordance with an embodiment, the text extraction system 102 may be configured to extract, from the document, the at least one text-entity matching the received input, based on the character pattern deciphered for the received input. It may be noted that once the character pattern associated with the received input (or input-token) may be deciphered, the character pattern may be used to extract, from the document, one or more text-entities which match the pattern associated with the input-token.

Figure 7:
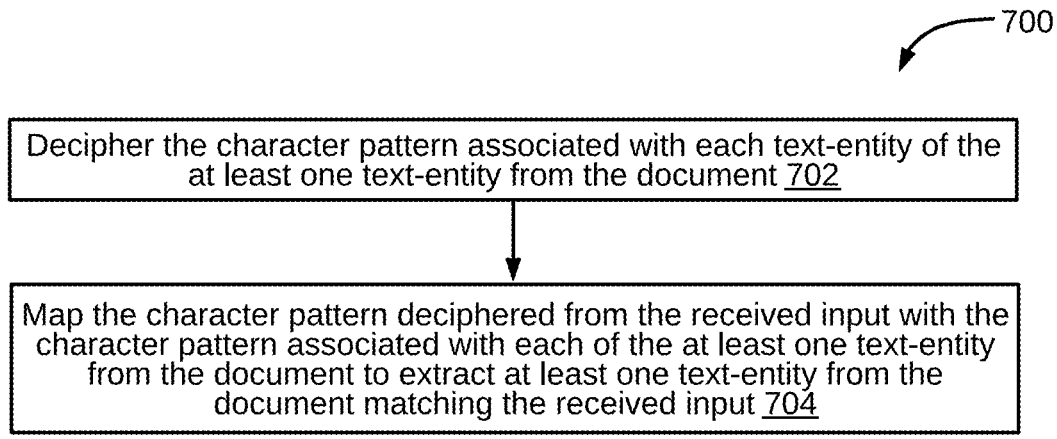
FIG. 7 is a flowchart of an exemplary method for extracting, from a document, at least one text-entity matching the received input, in accordance with an embodiment of the present disclosure.

Referring now to FIG. 7, a flowchart of an exemplary method 700 of extracting, from a document, at least one text-entity matching the received input is illustrated, in accordance with an embodiment of the present disclosure. FIG. 7 is explained in conjunction with elements from FIG. 1 to FIG. 6. The operations of the exemplary method 700 may be executed by any computing system, for example, by the text extraction system 102.

At step 702, a character pattern associated with each text-entity of the at least one text-entity may be deciphered from the document. In accordance with an embodiment, the text extraction system 102 may be configured to decipher the character pattern associated with each text-entity of the at least one text-entity from the document. For example, the document may be parsed to obtain various text-entities like words, in the document. In accordance with an embodiment, the character type associated with each of the plurality of characters in each text-entity of the document may include at least one of: an alphabet, a punctuation, or a digit. The step 702 of deciphering a character pattern associated with each text-entity of the at least one text-entity from the document is further explained in conjunction with FIG. 8.

Figure 8:
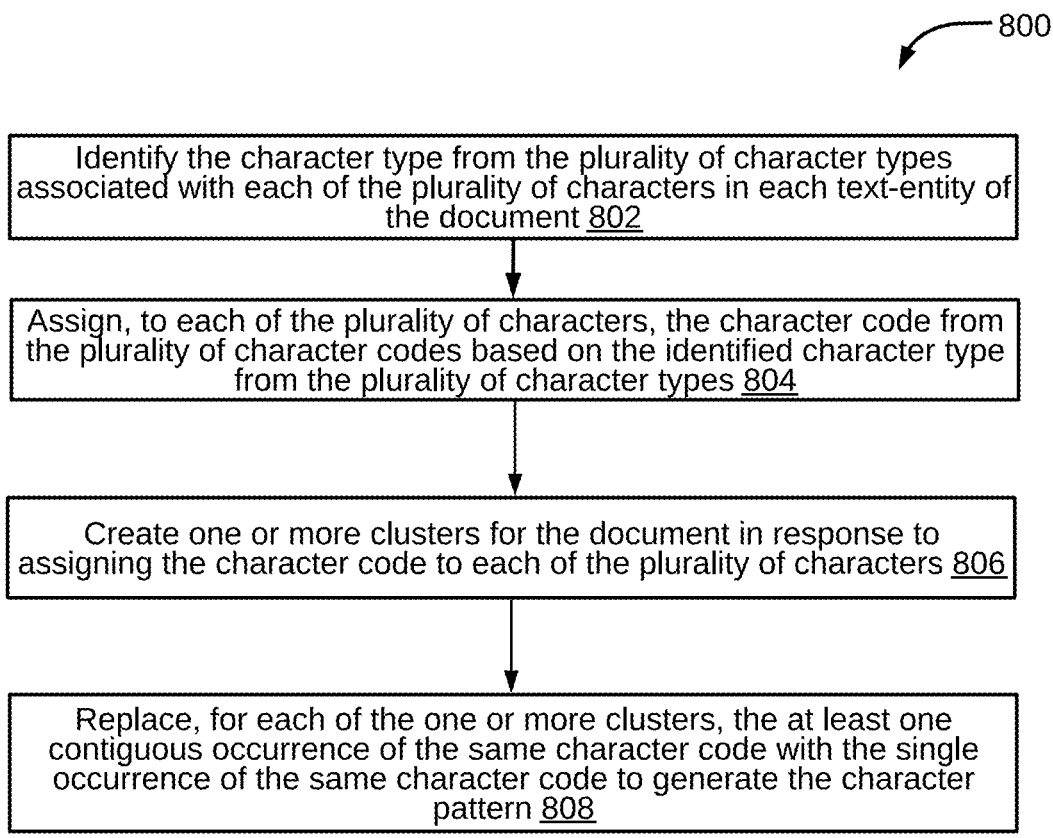
FIG. 8 is a flowchart of an exemplary method of deciphering a character pattern associated with each text-entity of the at least one text-entity from the document, in accordance with an embodiment of the present disclosure.

Referring now to FIG. 8, a flowchart of an exemplary method 800 of deciphering a character pattern associated with each text-entity of the at least one text-entity from the document is illustrated, in accordance with an embodiment of the present disclosure. FIG. 8 is explained in conjunction with elements from FIG. 1 to FIG. 7. The operations of the exemplary method 800 may be executed by any computing system, for example, by the text extraction system 102.

At step 802, a character type from a plurality of character types associated with each of a plurality of characters may be identified in each text-entity of the document. In accordance with an embodiment, the text extraction system 102 may be configured to identify the character type from the plurality of character types associated with each of the plurality of characters in each text-entity of the document. For example, the character type associated with text characters of each text-entity may include an alphabet, or a punctuation, or a digit.

At step 804, a character code from a plurality of character codes may be assigned to each of the plurality of characters. In accordance with an embodiment, the text extraction system 102 may be configured to assign, to each of the plurality of characters, the character code from the plurality of character codes based on the identified character type from the plurality of character types. For example, the character code corresponding to an alphabet may be 'a', the character code corresponding to a punctuation may be 'p', and to a digit may be 'd'.

At step 806, one or more clusters may be created for the document. In accordance with an embodiment, the text extraction system 102 may be configured to create one or more clusters for the document in response to assigning the character code to each of the plurality of characters. In accordance with an embodiment, each of the one or more clusters may include at least one contiguous occurrence of the same character code. In other words, one or more clusters may be created using similar character codes positioned adjacent to each other.

At step 808, at least one contiguous occurrence of the same character code may be replaced with a single occurrence of the same character code to generate the character pattern. In accordance with an embodiment, the text extraction system 102 may be configured to replace, for each of the one or more clusters, the at least one contiguous occurrence of the same character code with the single occurrence of the same character code to generate the character pattern.

Returning to FIG. 7, at step 704, character pattern deciphered from the received input may be mapped with the character pattern associated with each of the at least one text-entity from the document to extract at least one text-entity from the document matching the received input. In accordance with an embodiment, the text extraction system 102 may be configured to map the character pattern deciphered from the received input with the character pattern associated with each of the at least one text-entity from the document to extract at least one text-entity from the document matching the received input.

The present disclosure discusses various techniques for detecting point anomaly in input text. The techniques provide for various approaches for assigning a tag (annotation) to text inputs (or text data), in order to identify the anomaly. For example, the techniques use annotation parameters (POS, sentiment polarity, negation statement, and domain rules), and secondary data processing techniques (encoding/decoding technique and deep learning technique) to annotate the one or more un-annotated text entities of the text input. As such, the techniques use different approaches of NLP rules and deep learning for extracting inference from logs with high success rate and effectiveness. Further, the techniques provide cost-effective and time-efficient solution of detecting point anomaly from the text data.

It is intended that the disclosure and examples be considered as exemplary only, with a true scope and spirit of disclosed embodiments being indicated by the following claims.

What we claim is:

1. A method for detecting point anomaly in a text input, the method comprising:
   tokenizing, by a point anomaly detection device, the text input comprising a plurality of text entities into a plurality of tokens;
   annotating, by the point anomaly detection device, a first set of tokens from the plurality of tokens, based on one or more annotation parameters, wherein the one or more annotation parameters comprise a part-of-speech (POS), a sentiment polarity, a negation statement, and domain rules;
   annotating, by the point anomaly detection device, a second set of tokens from the plurality of tokens using at least one of one or more secondary data processing techniques, wherein the second set of tokens comprise alphanumeric codes, wherein the one or more secondary data processing techniques comprise an encoding/decoding technique, and wherein the encoding/decoding technique comprises:
      deciphering a character pattern associated with each of a plurality of tokens from the second set of tokens, wherein deciphering the character pattern comprises:
         identifying a character type from a plurality of character types associated with each of the plurality of characters in each of the plurality of tokens from the second set of tokens;
      assigning, to each of the plurality of characters, a character code from a plurality of character codes based on the identified character type from the plurality of character types;
      creating one or more clusters for each of the plurality of tokens from the second set of tokens in response to assigning the character code to each of the plurality of characters, wherein each of the one or more clusters comprises at least one contiguous occurrence of the same character code; and
      replacing, for each of the one or more clusters, the at least one contiguous occurrence of the same character code with a single occurrence of the same character code to generate the character pattern;
   extracting, from a document, at least one text-entity matching with at least one of the plurality of tokens from the second set of tokens, based on the character pattern deciphered for each of the plurality of tokens from the second set of tokens;
   deciphering a character pattern associated with each text-entity of the at least one text-entity from the document, wherein deciphering the character pattern comprises:
      identifying a character type from a plurality of character types associated with each of a plurality of characters in each text-entity of the document;
      assigning, to each of the plurality of characters, a character code from a plurality of character codes based on the identified character type from the plurality of character types;
      creating one or more clusters for the document in response to assigning the character code to each of the plurality of characters, wherein each of the one or more clusters comprises at least one contiguous occurrence of the same character code; and
      replacing, for each of the one or more clusters, at least one contiguous occurrence of the same character code with a single occurrence of the same character code to generate the character pattern; and
   mapping the character pattern deciphered from the received text input with the character pattern associated with each of the at least one text-entity from the document to extract at least one text-entity from the document matching the received text input;
   identifying, by the point anomaly detection device, from the plurality annotated tokens, at least one of:
      one or more anomaly subject tokens,
      one or more anomaly type tokens, and
      one or more action type tokens,
      based on the one or more annotation parameters; and
   generating, by the point anomaly detection device, inferences for the text input based on the identified one or more anomaly type tokens, the one or more action type tokens from the plurality of tokens, and the one or more annotation parameters.

2. The method as claimed in claim 1 further comprising identifying an anomaly subject token based on at least one of:
   a mapping of each of the plurality of tokens with a predefined database, based on semantic matching and syntactic matching; or
   a POS associated with each of the plurality of tokens, wherein the POS associated with an identified anomaly subject token is a noun.

3. The method as claimed in claim 1 further comprising identifying one or more anomaly type tokens from the plurality of tokens, based on: at least one of a mapping of each of the plurality of tokens with a domain lookup table, and one or more domain rules.

4. The method as claimed in claim 1 further comprising identifying one or more action type tokens from the plurality of tokens, based on at least one of:
- a mapping of each of the plurality of tokens with a predefined domain database, based on semantic matching and syntactic matching; or
- a POS associated with each of the plurality of tokens, wherein the POSs associated with the identified one or more anomaly subject tokens comprises a noun and a verb.

5. The method as claimed in claim 2, wherein the mapping comprises fetching one or more synonyms of each of the plurality of tokens.

6. The method as claimed in claim 1 further comprising pre-processing the plurality of text entities of the text input to shortlist one or more text entities to be annotated.

7. The method as claimed in claim 1, wherein the one or more secondary data processing techniques comprise:
- a deep learning technique for the input text comprising text sentences.

8. The method as claimed in claim 1, wherein the character type associated with each of the plurality of characters in the received text input or the character type associated with each of the plurality of characters in each text-entity of the document comprises at least one of: an alphabet, a punctuation, or a digit.

9. A system for transforming a test case document to an action driven template for software testing, the system comprising:
- a processor; and
- a memory communicatively coupled to the processor, wherein the memory stores processor-executable instructions, which, on execution, causes the processor to:
  - tokenize the text case document comprising a plurality of text entities into a plurality of tokens;
  - annotate a first set of tokens from the plurality of tokens, based on one or more annotation parameters, wherein the one or more annotation parameters comprise a part-of-speech (POS), a sentiment polarity, a negation statement, and domain rules;
  - annotate a second set of tokens from the plurality of tokens using at least one of one or more secondary data processing techniques, wherein the second set of tokens comprise alphanumeric codes, wherein the one or more secondary data processing techniques comprise an encoding/decoding technique, and wherein the encoding/decoding technique comprises:
    - deciphering a character pattern associated with each of a plurality of tokens from the second set of tokens, wherein deciphering the character pattern comprises:
      - identifying a character type from a plurality of character types associated with each of the plurality of characters in each of the plurality of tokens from the second set of tokens;
      - assigning, to each of the plurality of characters, a character code from a plurality of character codes based on the identified character type from the plurality of character types;
      - creating one or more clusters for each of the plurality of tokens from the second set of tokens in response to assigning the character code to each of the plurality of characters, wherein each of the one or more clusters comprises at least one contiguous occurrence of the same character code; and
      - replacing, for each of the one or more clusters, the at least one contiguous occurrence of the same character code with a single occurrence of the same character code to generate the character pattern;
    - extracting, from a document, at least one text-entity matching with at least one of the plurality of tokens from the second set of tokens, based on the character pattern deciphered for each of the plurality of tokens from the second set of tokens;
    - deciphering a character pattern associated with each text-entity of the at least one text-entity from the document, wherein deciphering the character pattern comprises:
      - identifying a character type from a plurality of character types associated with each of a plurality of characters in each text-entity of the document;
      - assigning, to each of the plurality of characters, a character code from a plurality of character codes based on the identified character type from the plurality of character types;
      - creating one or more clusters for the document in response to assigning the character code to each of the plurality of characters, wherein each of the one or more clusters comprises at least one contiguous occurrence of the same character code; and
      - replacing, for each of the one or more clusters, at least one contiguous occurrence of the same character code with a single occurrence of the same character code to generate the character pattern; and
    - mapping the character pattern deciphered from the received text input with the character pattern associated with each of the at least one text-entity from the document to extract at least one text-entity from the document matching the received text input;
  - identify from the plurality of annotated tokens, at least one of:
    - one or more anomaly subject tokens,
    - one or more anomaly type tokens, and
    - one or more action type tokens,
    based on the one or more annotation parameters; and
  - generate inferences for the text input case document based on the identified one or more anomaly type tokens, the one or more action type tokens from the plurality of tokens, and the one or more annotation parameters.

10. The system as claimed in claim 9 the processor-executable instructions further cause the processor to identify an anomaly subject token based on at least one of:
- a mapping of each of the plurality of tokens with a predefined database, based on semantic matching and syntactic matching; or
- a POS associated with each of the plurality of tokens, wherein the POS associated with an identified anomaly subject token is a noun.

11. The system as claimed in claim 9 the processor-executable instructions further cause the processor to identify one or more anomaly type tokens from the plurality of tokens, based on at least one of a mapping of each of the plurality of tokens with a domain lookup table and one or more domain rules.

12. The system as claimed in claim 9 the processor-executable instructions further cause the processor to identify one or more action type tokens from the plurality of tokens, based on at least one of:
- a mapping of each of the plurality of tokens with a predefined domain database, based on semantic matching and syntactic matching; or
- a POS associated with each of the plurality of tokens, wherein the POSs associated with the identified one or more anomaly subject tokens comprise a noun and a verb.

13. The system as claimed in claim 9, wherein the character type associated with each of the plurality of characters in the received text input or the character type associated with each of the plurality of characters in each text-entity of the document comprises at least one of: an alphabet, a punctuation, or a digit.

14. A non-transitory computer-readable medium storing computer-executable instruction for detecting point anomaly in a text input, the computer-executable instructions configured for:
- tokenizing the text input comprising a plurality of text entities into a plurality of tokens;
- annotating a first set of tokens from the plurality of tokens, based on one or more annotation parameters, wherein the one or more annotation parameters comprise a part-of-speech (POS), a sentiment polarity, a negation statement, and domain rules;
- annotating a second set of tokens from the plurality of tokens using at least one of one or more secondary data processing techniques, wherein the second set of tokens comprise alphanumeric codes, wherein the one or more secondary data processing techniques comprise an encoding/decoding technique, and wherein the encoding/decoding technique comprises:
  - deciphering a character pattern associated with each of a plurality of tokens from the second set of tokens, wherein deciphering the character pattern comprises:
    - identifying a character type from a plurality of character types associated with each of the plurality of characters in each of the plurality of tokens from the second set of tokens;
    - assigning, to each of the plurality of characters, a character code from a plurality of character codes based on the identified character type from the plurality of character types;
    - creating one or more clusters for each of the plurality of tokens from the second set of tokens in response to assigning the character code to each of the plurality of characters, wherein each of the one or more clusters comprises at least one contiguous occurrence of the same character code; and
    - replacing, for each of the one or more clusters, the at least one contiguous occurrence of the same character code with a single occurrence of the same character code to generate the character pattern;
  - extracting, from a document, at least one text-entity matching with at least one of the plurality of tokens from the second set of tokens, based on the character pattern deciphered for each of the plurality of tokens from the second set of tokens;
  - deciphering a character pattern associated with each text-entity of the at least one text-entity from the document, wherein deciphering the character pattern comprises:
    - identifying a character type from a plurality of character types associated with each of a plurality of characters in each text-entity of the document;
    - assigning, to each of the plurality of characters, a character code from a plurality of character codes based on the identified character type from the plurality of character types;
    - creating one or more clusters for the document in response to assigning the character code to each of the plurality of characters, wherein each of the one or more clusters comprises at least one contiguous occurrence of the same character code; and
    - replacing, for each of the one or more clusters, at least one contiguous occurrence of the same character code with a single occurrence of the same character code to generate the character pattern; and
  - mapping the character pattern deciphered from the received text input with the character pattern associated with each of the at least one text-entity from the document to extract at least one text-entity from the document matching the received text input;
- identifying from the plurality of annotated tokens, at least one of:
  - one or more anomaly subject tokens,
  - one or more anomaly type tokens, and
  - one or more action type tokens from the plurality of tokens,
  based on the one or more annotation parameters; and
- generating inferences based on the identified one or more anomaly type tokens, the one or more action type tokens from the plurality of tokens, and the one or more annotation parameters.

* * * * *